United States Patent
Iwasaki

(10) Patent No.: US 9,865,076 B2
(45) Date of Patent: Jan. 9, 2018

(54) RENDERING APPARATUS

(71) Applicant: SQUARE ENIX HOLDINGS CO., LTD., Tokyo (JP)

(72) Inventor: Tetsuji Iwasaki, Tokyo (JP)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 171 days.

(21) Appl. No.: 15/057,577

(22) Filed: Mar. 1, 2016

(65) Prior Publication Data

US 2016/0180575 A1 Jun. 23, 2016

Related U.S. Application Data

(63) Continuation of application No. PCT/JP2014/003292, filed on Jun. 19, 2014.

(30) Foreign Application Priority Data

Sep. 13, 2013 (JP) ................................ 2013-191005

(51) Int. Cl.
G06T 15/00 (2011.01)
G06T 15/40 (2011.01)
G06T 1/20 (2006.01)

(52) U.S. Cl.
CPC .............. *G06T 15/005* (2013.01); *G06T 1/20* (2013.01); *G06T 15/405* (2013.01)

(58) Field of Classification Search
None
See application file for complete search history.

(56) References Cited

U.S. PATENT DOCUMENTS 6,377,257 B1 * 4/2002 Borrel ................... G06T 15/005
345/419
8,228,328 B1 7/2012 French et al.
2008/0094395 A1 * 4/2008 Woo ...................... G06T 15/405
345/422

(Continued)

FOREIGN PATENT DOCUMENTS

JP 10-307932 11/1998
JP 2002-183751 6/2002

(Continued)

OTHER PUBLICATIONS

International Search Report (ISR) from International Searching Authority (Japan Patent Office) in International Pat. Appl. No. PCT/JP2014/003292, dated Sep. 9, 2014.

(Continued)

*Primary Examiner* — Kee M Tung
*Assistant Examiner* — Xin Sheng
(74) *Attorney, Agent, or Firm* — Greenblum & Bernstein, P.L.C.

(57) ABSTRACT

A first GPU of a rendering apparatus, after rendering by a second GPU that renders a second depth range that is closer to the viewpoint than a first depth range that the first GPU renders is performed, receives the image rendered by the second GPU and the identifying information that identifies the pixels for which rendering objects are rendered in the image. After the reception, the first GPU, when rendering a rendering object included in the first depth range in accordance with the viewpoint, performs rendering of pixels, from the image rendered by the second GPU, that are not identified by the identifying information, and does not perform rendering of pixels identified by the identifying information.

7 Claims, 5 Drawing Sheets

(56) References Cited

U.S. PATENT DOCUMENTS

| | | | |
|---|---|---|---|
| 2008/0194320 A1* | 8/2008 | Walsh | G07F 17/3202 463/25 |
| 2009/0257084 A1* | 10/2009 | Sakamoto | G06F 3/1208 358/1.15 |
| 2011/0128286 A1* | 6/2011 | Park | G06T 17/00 345/424 |
| 2012/0259727 A1* | 10/2012 | Fermin | G06Q 30/00 705/26.5 |
| 2012/0299910 A1 | 11/2012 | Liang | |
| 2012/0299919 A1* | 11/2012 | Sakurai | G06T 17/005 345/420 |
| 2013/0064465 A1 | 3/2013 | Tin | |
| 2013/0135308 A1* | 5/2013 | Kho | G06T 15/08 345/424 |

FOREIGN PATENT DOCUMENTS

| | | |
|---|---|---|
| JP | 2006-338542 | 12/2006 |
| WO | 2012/161102 | 11/2012 |
| WO | 2013/069654 | 5/2013 |

OTHER PUBLICATIONS

Extended European Search Report from European Patent Office (EPO) in European Patent Appl. No. 14844965.5, dated Mar. 20, 2017.

Downs L et al., "Occlusion Horizons for Driving Through Urban Scenery", Proceedings of the 2001 Symposium on Interactive 3D Graphics. Research Triangle Park, NC, Mar. 19-21, 2001; New York, NY: ACM, US, XP001113635, pp. 121-124 (Mar. 19, 2001).

Zang et al., "Effective Occlusion Culling for the Interactive Display of Arbitrary Models", Dissertation Submitted to the Faculty of the University of North Carolina at Chapel Hill in Partial Fulfillment of the Requirements for the Degree of Doctor of Philosophy in the Department of Computer Sciences, XX, XX, XP002400735 (Jan. 1, 1998).

* cited by examiner

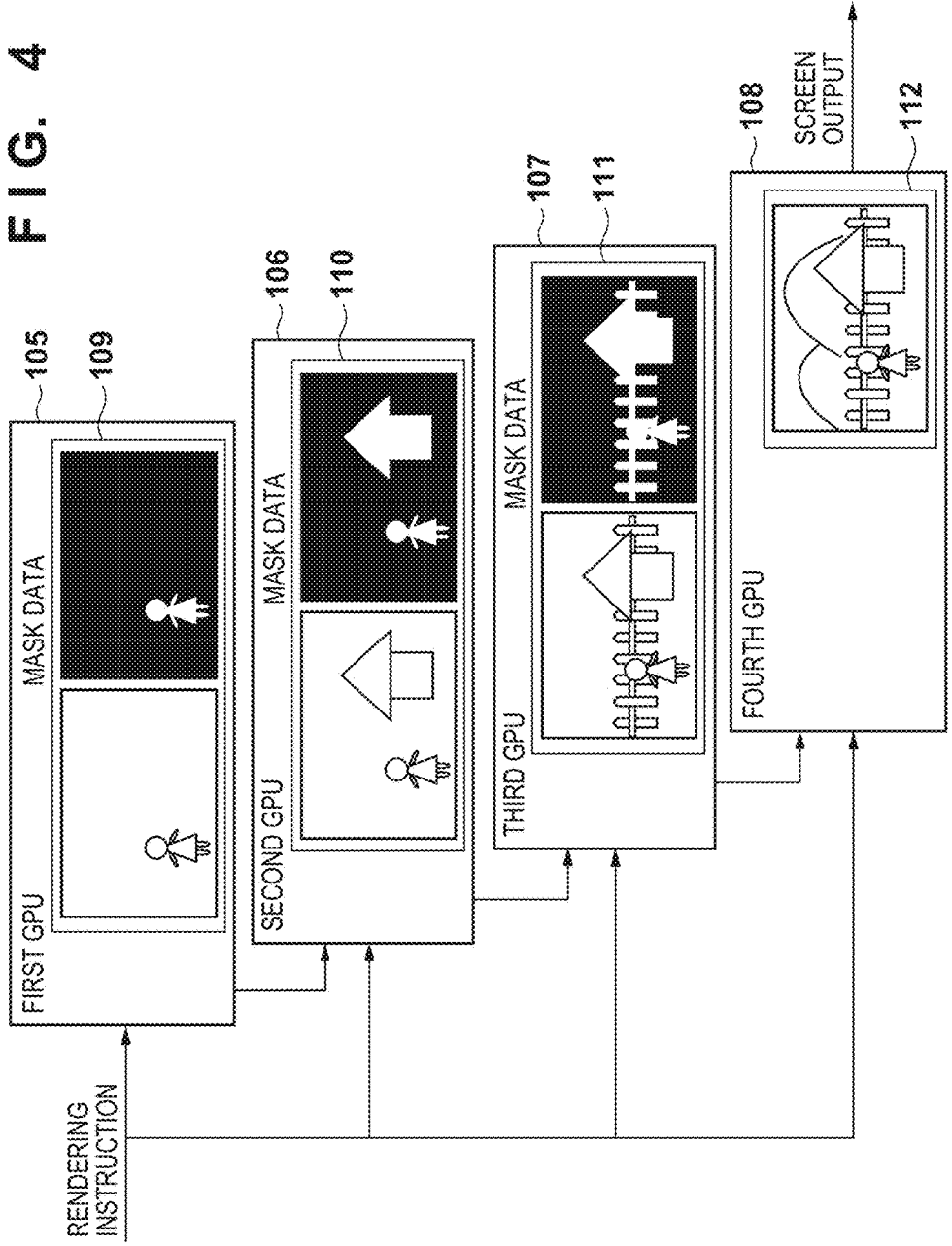

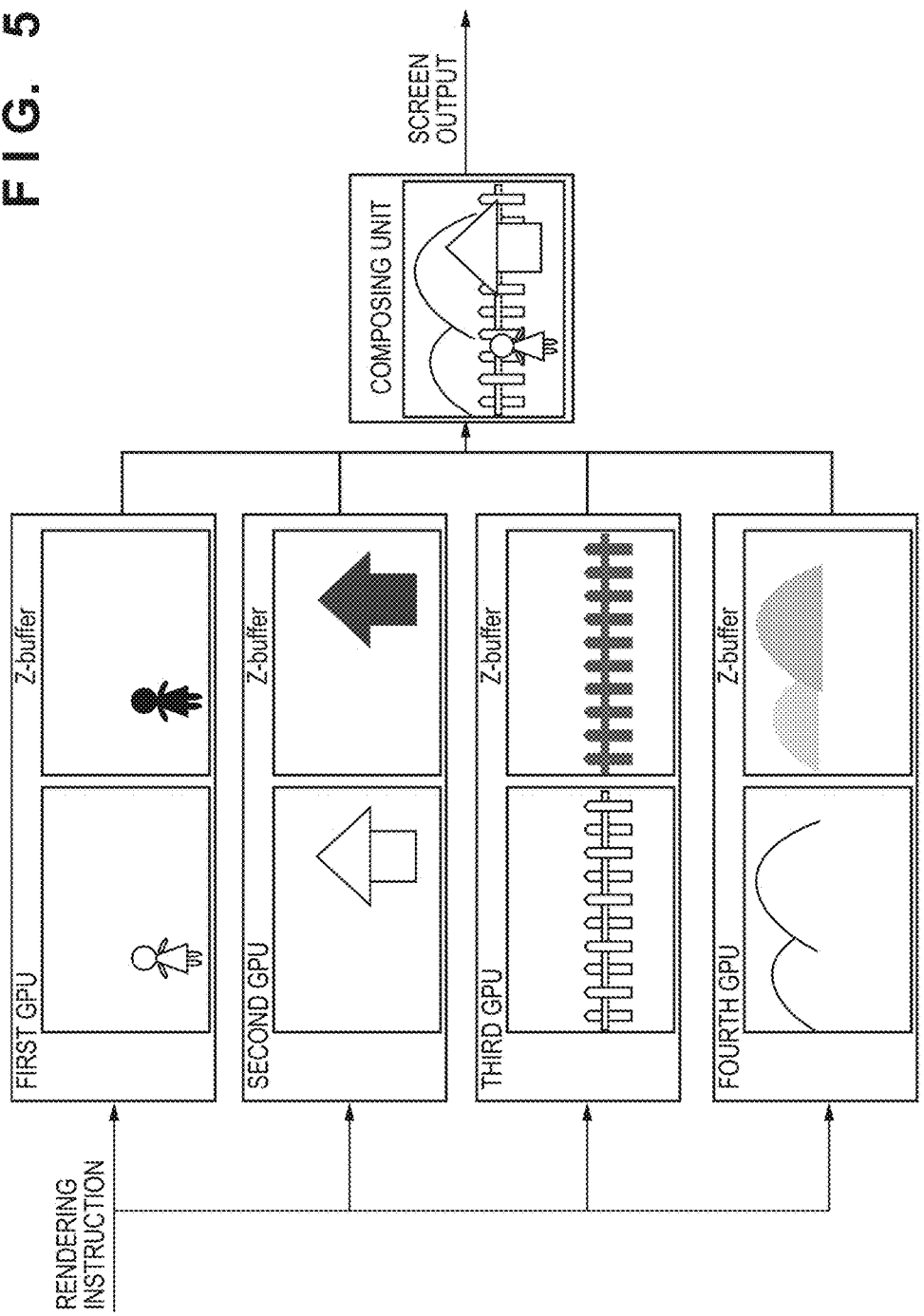

RENDERING APPARATUS

This application is a continuation of International Patent Application No. PCT/JP2014/003292 filed on Jun. 19, 2014, and claims priority to Japanese Patent Application No. 2013-191005 filed on Sep. 13, 2013, the entire content of both of which is incorporated herein by reference.

TECHNICAL FIELD

The present invention relates to a rendering apparatus, and in particular a technique for rendering 3D graphics.

BACKGROUND ART

For rendering of 3D graphics, for games or the like, in conjunction with an increase in resolution of a display apparatus, there is a tendency for screens that are rendered to have an increase in pixels. Because a calculation amount for rendering of a screen increases in proportion to the number of pixels, in particular, rendering of a screen corresponding to content such as that for which a real-time capability is requested requires optimization.

In recent years, there are cases in which rendering of a screen is optimized by using a plurality of GPUs. In patent document 1, by classifying GPUs that render in accordance with a z-value of a rendering object, and composing images of the respective rendered rendering objects referring to the z-value, a screen that is a final output is generated. More specifically, in a case of rendering one screen by four GPUs as illustrated in FIG. 5, each GPU outputs an image that has rendered a rendering object having a respectively different z-value, and a z-buffer indicating a z-value of each pixel in the image. A composing unit then generates a final output screen by performing a z-value comparison of z-buffers corresponding to these images and composing so as to employ, for each pixel, the pixel of the rendering object that is present the most at the front.

CITATION LIST

Patent Literature

[PTL1] Japanese Patent Laid-Open No. H10-307932

SUMMARY OF INVENTION

Technical Problem

However, with a method such as that of patent document 1, because a pixel, from pixels included in an image rendered by different GPUs, that is occluded by composition does not appear in the final screen, there was a possibility that processing for rendering that portion is pointless. For example, in a case of rendering one screen by four GPUs as in FIG. 5, because, in generation of a final output screen in the composing unit, pixels of a rendering object that are not present at the most forward in the images that each GPU rendered will not appear at all in the final output screen, the pixels are discarded without being used.

The present invention is something that was made in view of the above-described problem, and has an objective of providing a rendering apparatus that reduces unnecessary processing when performing processing for rendering one screen rendering which is distributed among a plurality of GPUs.

Solution to Problem

The present invention in its first aspect provides a rendering apparatus that uses a plurality of renderers to render one screen, the rendering apparatus comprising: a determiner which is able to determine, based on information of a viewpoint corresponding to the one screen, a depth range from a rendering range corresponding to the one screen at which to cause each of the plurality of renderers to render, wherein each of the plurality of renderers performs a predetermined calculation corresponding to a rendering object included in the depth range at which to render, and wherein a first renderer from the plurality of renderers, after rendering is performed by a second renderer that renders at a second depth range closer to the viewpoint than a first depth range at which the first renderer renders, receives an image rendered by the second renderer and identifying information that identifies a pixel for which a rendering object has been rendered in the image, and after reception, when rendering a rendering object included in the first depth range in accordance with the viewpoint, performs rendering of a pixel, from the image rendered by the second renderer, that is not identified by the identifying information, and does not perform rendering of a pixel identified by the identifying information.

The present invention in its second aspect provides a rendering apparatus that uses a plurality of renderers to render one screen, wherein each of the plurality of renderers includes a determiner which is able to determine, based on information of a viewpoint corresponding to the one screen, a depth range, from a rendering range corresponding to the one screen, for which to handle rendering and a calculator which is able to perform a predetermined calculation corresponding to a rendering object included in the depth range determined by the determiner, wherein a first renderer from the plurality of renderers, after rendering is performed by a second renderer that handles a second depth range closer to the viewpoint than a first depth range that the first renderer handles, receives an image rendered by the second renderer and identifying information that identifies a pixel for which a rendering object has been rendered in the image, and after reception, when rendering a rendering object included in the first depth range in accordance with the viewpoint, performs rendering of a pixel, from the image rendered by the second renderer, that is not identified by the identifying information, and does not perform rendering of a pixel identified by the identifying information.

The present invention in its third aspect provides a rendering apparatus that uses a plurality of renderers to render one screen, the rendering apparatus comprising: a determiner which is able to determine, based on information of a viewpoint corresponding to the one screen, a depth range from a rendering range corresponding to the one screen at which to cause each of the plurality of renderers to render, wherein each of the plurality of renderers performs a predetermined calculation corresponding to a rendering object included in the depth range at which to render, and wherein a first renderer from the plurality of renderers, after rendering is performed by a second renderer that renders at a second depth range closer to the viewpoint than a first depth range at which the first renderer renders, receives an image rendered by the second renderer and depth information that indicates a depth value of each pixel in the image, and after reception, when rendering a rendering object included in the first depth range in accordance with the viewpoint, if a depth value of a pixel, from the image rendered by the second renderer, that is indicated by the depth information is of a value indicating a further distance than a depth value of a rendering object to be rendered in that pixel which is included in the first depth range, performs rendering of that pixel, and if the depth value is of a value that does not indicate the further distance, does not render that pixel.

The present invention in its fourth aspect provides a rendering apparatus that uses a plurality of renderers to render one screen, wherein each of the plurality of renderers includes a determiner which is able to determine, based on information of a viewpoint corresponding to the one screen, a depth range, from a rendering range corresponding to the one screen, for which to handle rendering and a calculator which is able to perform a predetermined calculation corresponding to a rendering object included in the depth range determined by the determiner, wherein a first renderer from the plurality of rendering means, after rendering is performed by a second renderer that handles a second depth range closer to the viewpoint than a first depth range that the first renderer handles, receives an image rendered by the second renderer and depth information that indicates a depth value of each pixel in the image, and after reception, when rendering a rendering object included in the first depth range in accordance with the viewpoint, if a depth value of a pixel, from the image rendered by the second renderer, that is indicated by the depth information is of a value indicating a further distance than a depth value of a rendering object to be rendered in that pixel which is included in the first depth range, performs rendering of that pixel, and if the depth value is of a value that does not indicate the further distance, does not render that pixel.

Advantageous Effects of Invention

By virtue of the present invention, in accordance with such configurations, it is possible to reduce unnecessary processing when performing processing for rendering one screen rendering by distributing it among a plurality of GPUs.

Further features and advantages of the present invention will become apparent from the following description with reference to the attached drawings. Note, in the accompanying drawings, the same reference numerals are added for same or similar configuration elements.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 4 is a view for illustrating a flow of processing for rendering according to embodiments of the present invention.

FIG. 5 is a view for illustrating a flow of processing for rendering according to a conventional technique.

DESCRIPTION OF EMBODIMENTS

[Embodiments]

Exemplary embodiments of the present invention will be described hereinafter in detail, with reference to the drawings. Note that an embodiment explained below explains an example of applying the present invention to a PC that can process one screen rendering by distributing among a plurality of GPUs as an example of a rendering apparatus. However, the present invention is applicable to any device that can process one screen rendering by distributing among a plurality of GPUs.

<Configuration of a PC 100>

Figure 1:
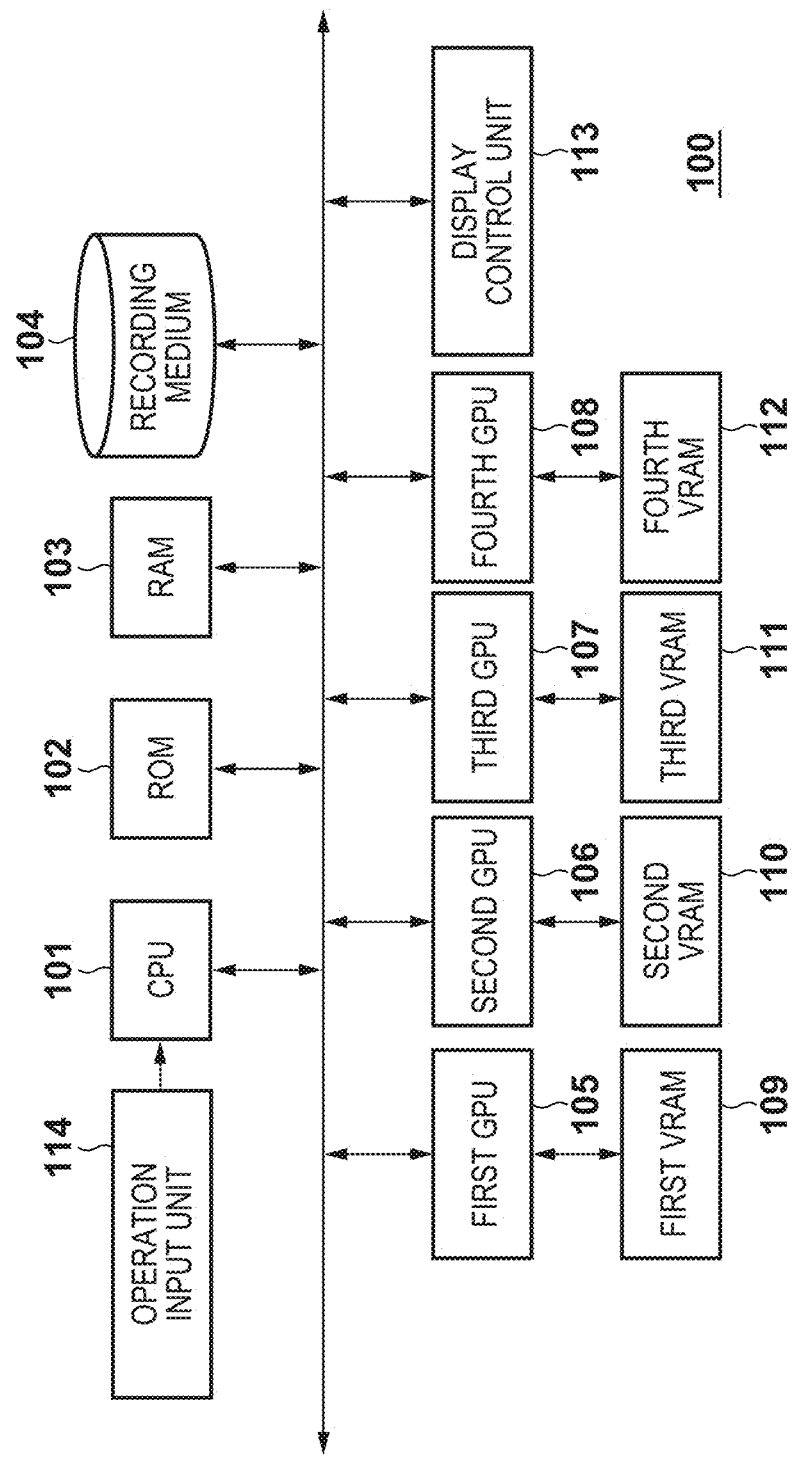
FIG. 1 is a block diagram for showing a functional configuration of a PC 100 according to embodiments of the present invention.

FIG. 1 is a block diagram for showing a functional configuration of a PC 100 according to embodiments of the present invention.

A CPU 101 controls operation of each block that the PC 100 has. Specifically, the CPU 101, for example, by reading an operation program or the like of each block that is stored in a ROM 102 or a recording medium 104, loading it into a RAM 103, and executing it, controls operation of each block.

The ROM 102 is for example a rewritable, non-volatile memory. The ROM 102, in addition to an operation program of each block, stores information, such as another operation program, or a constant necessary in operation of each block that the PC 100 has.

The RAM 103 is a volatile memory. The RAM 103 is used, not just as a loading region of the operation program, but also as a storage region that temporarily stores intermediate data, which is output in the operation of each block that the PC 100 has, or the like.

The recording medium 104 is for example a recording apparatus that is detachably connected to the PC 100, such as an HDD. In the present embodiment, in the recording medium 104, a program that corresponds to an operating system of the PC 100, or a program that corresponds to a game application that includes later described game processing, is stored. In addition, in the recording medium 104, data that corresponds to a rendering object used in the generation of a screen in processing for rendering is stored. Data that corresponds to the rendering object for example may include:
  model data,
  texture data,
  a rendering program such as a shader,
  or the like.

A first GPU 105, a second GPU 106, a third GPU 107, and a fourth GPU 108 perform rendering/generation of a game screen to output in game processing of the present embodiment. For each GPU, a video memory (a first VRAM 109, a second VRAM 110, a third VRAM 111, and a fourth VRAM 112) is connected as a rendering region of the game screen. Note that in the present embodiment, explanation is given of something in which one video memory is connected to one GPU, but implementation of the present invention is not limited to this. In other words, the number of video memories that are connected to a GPU may be any number, and, for example a configuration may be taken in which a plurality of GPUs share one video memory.

A display control unit 113 is a display output interface that the PC 100 has. The display control unit 113, upon receiving a game screen rendered in a VRAM, outputs the game screen in an optional output signal format to a connected, display apparatus (not shown). Note that in the present embodiment, for the PC 100 the display apparatus is explained as an externally connected apparatus, but it goes without saying that, as in a laptop-type PC, the display apparatus may be an integrated apparatus.

An operation input unit 114 is a user input interface that the PC 100 has, such as for example a mouse, a keyboard, or a game pad. The operation input unit 114, upon detecting that these operation input devices have been operated by a user, outputs to the CPU 101 a control signal corresponding to an operation input.

<Game Processing>

Figure 2:
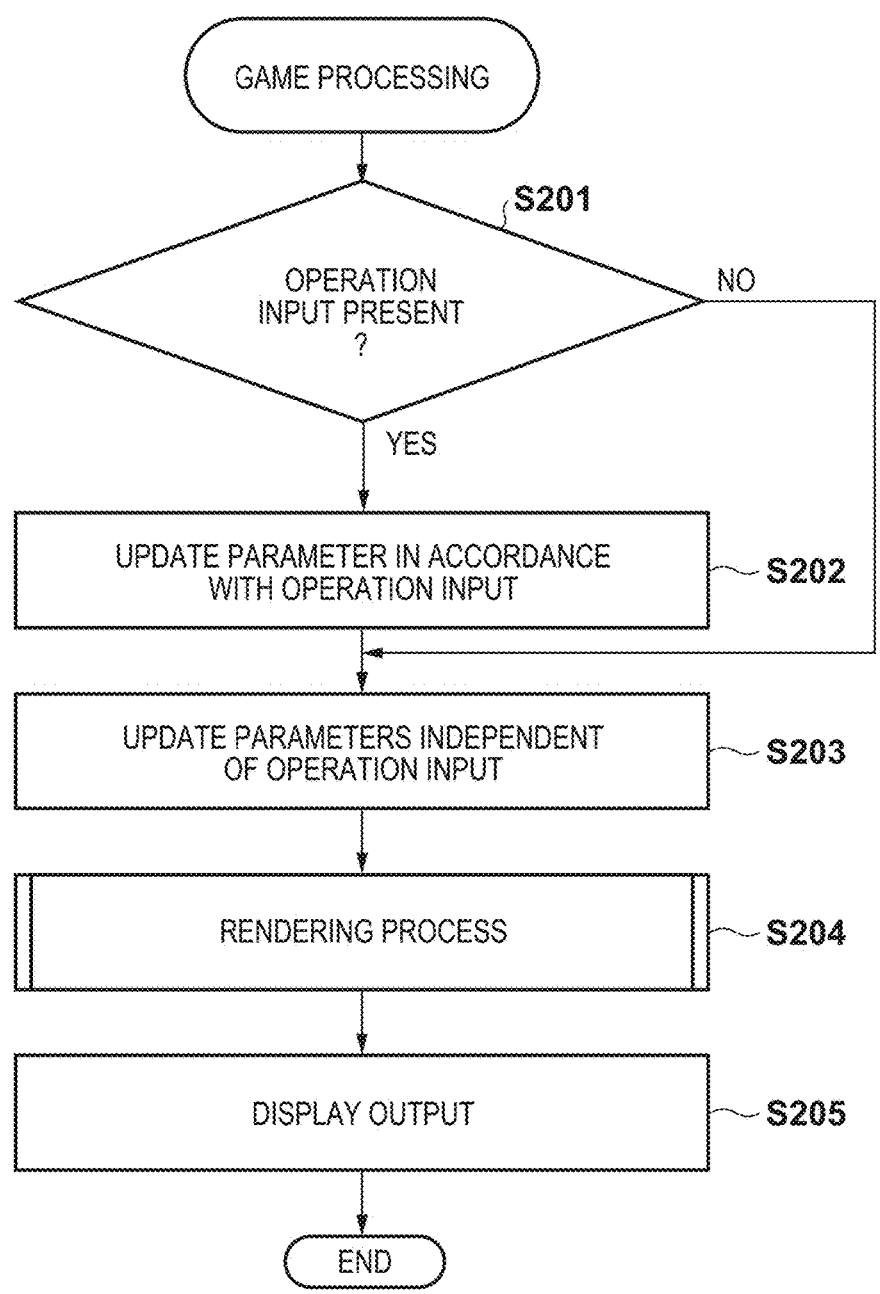
FIG. 2 is a flowchart that exemplifies game processing executed in the PC 100 according to embodiments of the present invention.

Regarding game processing that performs screen presentation of 3D graphics executed in the PC 100 of the present embodiment having this kind of configuration, specific processing is explained using the flowchart of FIG. 2. The processing corresponding to this flowchart can be realized, for example, by the CPU 101 reading a processing program corresponding to a game application stored in the recording medium 104, loading it into the RAM 103, and executing it. Note that this game processing is, for example, explained as processing in accordance with screen output that is repeatedly executing in accordance with a frame rate at which updating of the game screen is performed.

For step S201, the CPU 101 determines whether or not an operation input in accordance with progress of a game has been performed. The CPU 101 moves the processing to step S202 in a case where it has determined that the operation input in accordance with the progress of the game has been performed, and moves the processing to step S203 in cases where it has determined that the operation input has not been performed.

In step S202, the CPU 101 updates, based on the detected operation input, various parameters in the game that change in accordance with the operation input in accordance with the progress of the game. These parameters may be, for example, information that indicates a position, an orientation, or an action or the like of a character.

In step S203, the CPU 101 updates, various parameters in the game that change independently of operation input, for example based on an elapsed time period or the like. These parameters, for example, may be information in relation to a color shade of a background or a light source, a position of an NPC that operates independently of an operation input, or the like.

In step S204, the CPU 101 executes rendering processing that performs rendering of a game screen in accordance with a current frame, by parameters after updating.

<Rendering Process>

Figure 3:
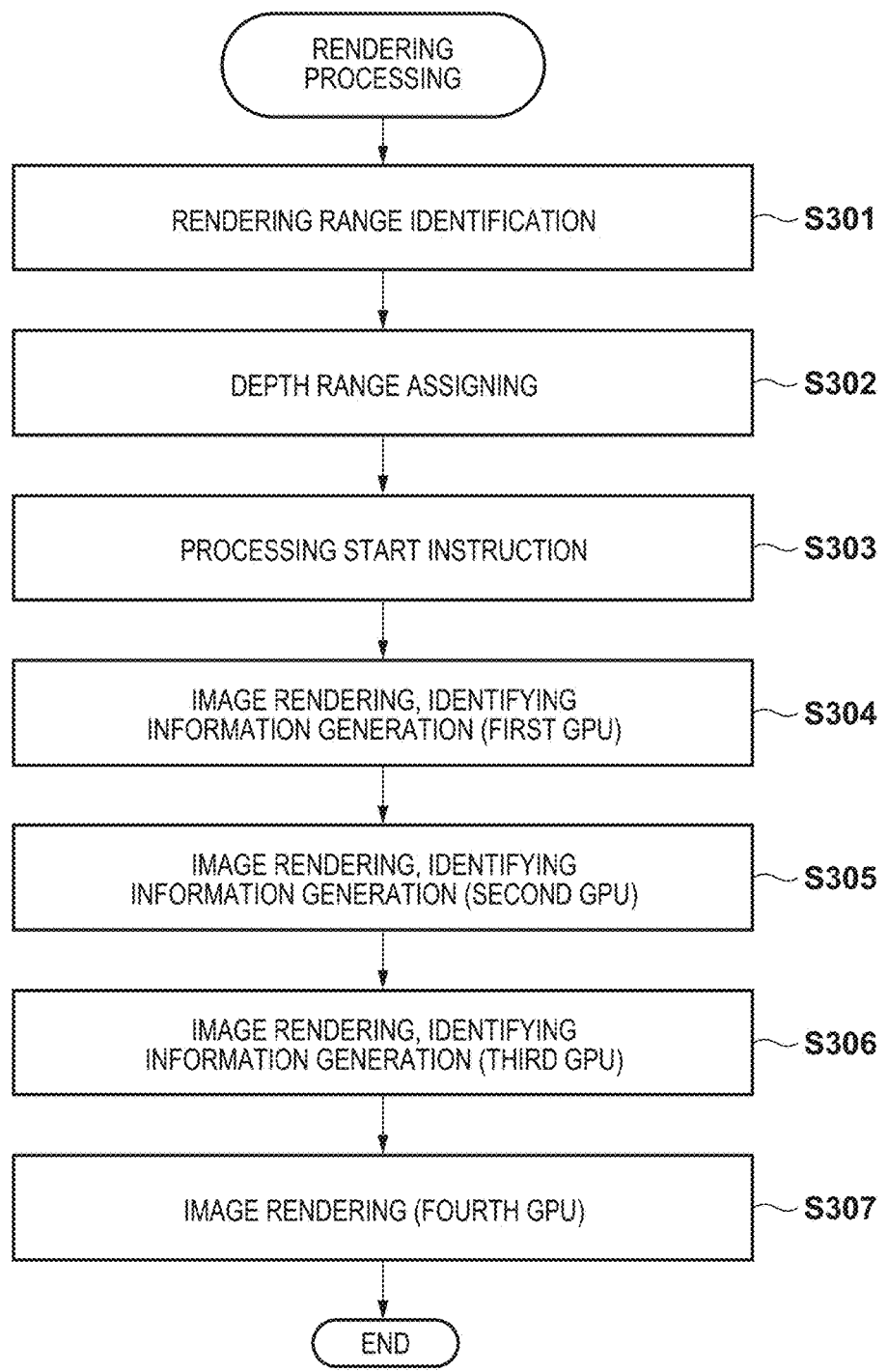
FIG. 3 is a flowchart that exemplifies rendering processing executed in the PC 100 according to embodiments of the present invention.

Here, regarding rendering processing executed in the PC 100 of the present embodiment, a flowchart of FIG. 3 is used to explain detail.

In step S301 the CPU 101 refers to information of a viewpoint corresponding to the game screen to render, and identifies a rendering range. Information of the viewpoint includes a position of the viewpoint and an orientation thereof, a shortest render distance and a longest render distance, and information of an angle of view, or the like. The CPU 101, in accordance with this information, from a three-dimensional field represented in the game, identifies a rendering range at which to render a game screen in accordance with the current frame.

In step S302 the CPU 101 classifies the rendering range into a predetermined number of depth ranges in a depth (z-value) direction, and for rendering objects differing for each depth range, assigns rendering of the rendering objects included in the respective depth range. According to this embodiment, because the PC 100 has four types of GPUs, explanation is given of the rendering range being classified into four depth ranges, but implementation of the present invention is not limited to this, and if a number of classifications of the rendering range is two or more, determination may be performed irrespective of the number of GPUs.

Note that, according to this embodiment, a depth range closest to the viewpoint is allocated to the first GPU 105, and in an order in a direction away from the viewpoint, other depth ranges are allocated to the second GPU 106, the third GPU 107, and the fourth GPU 108. However, similar to the number of classifications, implementation of the present invention is not limited to this, and, for example, configuration may be such that, in a case in which the number of classifications is smaller than the number of GPUs, each depth range is allocated to a portion of the GPUs, and conversely in a case in which the number of classifications is greater than the number of GPUs, a plurality of depth ranges is allocated to a portion of the GPUs.

In step S303 the CPU 101 outputs, to each GPU, a start instruction for various processing in accordance with a rendering object included in the allocated depth range. In this step, the various processing, for which a start instruction is performed, for example may include loading processing for data corresponding to the rendering object, a coordinate transformation calculation such as a translation/rotation of the rendering object, a light source or effect calculation, or the like.

In contrast, in the various start instructions performed in this step, configuration may be taken to not include a start instruction for processing for rendering the rendering object subject to a coordinate transformation or the like. As will be explained later, in the present embodiment each GPU starts processing for rendering after rendering of the rendering objects included in depth ranges closer to the viewpoint than the depth range allocated to it. Accordingly, even if the start instruction for the processing for rendering in this step has been made, the satisfaction of a separate condition is necessary for its initiation, and in particular in the second GPU 106, the third GPU 107, and the fourth GPU 108, the processing for rendering is not started immediately.

In step S304 the first GPU 105, under the control of the CPU 101, performs rendering of a rendering object included in the depth range closest to the viewpoint which is allocated thereto. At this point the first GPU 105, for an image generated by the rendering of the rendering object, generates identifying information that identifies whether or not the rendering object is rendered for each pixel of the image, in other words pixels in which the rendering object is rendered. The identifying information may be any configuration, such as two-dimensional mask data having a number of pixels that is the same as that of the generated image and in which a value of each pixel is represented by one bit (boolean information), an array having similar information, or the like, for example.

The first GPU 105, when rendering completes, outputs the generated image and the identifying information to the second GPU 106, to which has been allocated a depth range closest to the viewpoint following the depth range that the first GPU 105 rendered.

The second GPU 106, upon receiving the generated image and the identifying information from the first GPU 105, in step S305 performs rendering of the rendering objects included at the allocated depth range. At this point the second GPU 106 refers to the identifying information, and identifies pixels for which no rendering object has been rendered yet in the pixels of the received generated image. Rendering of rendering objects included in the allocated depth range is performed for these pixels only.

Note that rendering of the second GPU 106 may be performed in a form in which the pixels of the generated image that is generated by the first GPU 105 are overwritten. This is because values of pixels for which rendering of the rendering object has been performed by the first GPU 105 out of the generated image are not updated since the second GPU 106 does not perform rendering for pixels for which a rendering object has already been rendered.

In addition the second GPU 106 performs an update of the identifying information. Specifically, the second GPU 106 changes information, from the identifying information, corresponding to pixels for which rendering of a rendering object has been newly performed in the generated image so as to indicate that the rendering object has been rendered in the pixels. In this way, the identifying information becomes information that can identify not only the allocated depth range but also pixels for which the rendering objects included in all depth ranges closer to the viewpoint than the depth range have been rendered.

The second GPU 106, when rendering completes, outputs the updated generated image and the identifying information to the third GPU 107, to which has been allocated a depth range closest to the viewpoint following the depth range that the second GPU 106 rendered.

The third GPU 107, upon receiving the generated image and the identifying information from the second GPU 106, in step S306 performs rendering of the rendering objects included at the allocated depth range. At this point the third GPU 107 refers to the identifying information, and identifies pixels for which no rendering object has been rendered yet in of the received generated image. Rendering of rendering objects included in the allocated depth range is performed for these pixels only. In addition, the third GPU 107 also performs an update of the identifying information similarly to step S305.

The third GPU 107, when rendering completes, outputs the updated generated image and the identifying information to the fourth GPU 108, to which has been allocated a depth range closest to the viewpoint following the depth range that the third GPU 107 rendered.

The fourth GPU 108, upon receiving the generated image and the identifying information from the third GPU 107, in step S307 performs rendering of the rendering objects included at the allocated depth range. At this point the fourth GPU 108 refers to the identifying information, and identifies pixels for which no rendering object has been rendered yet in the pixels of the received generated image. Rendering of rendering objects included in the allocated depth range is performed for these pixels only, and this rendering processing completes. Because it is possible to render all rendering object at the rendering ranges identified in step S301 in this way, the fourth GPU 108 can render the game screen, which is the final output, in the fourth VRAM 112. Note that for the fourth GPU 108, because there is no need to output the generated image (the game screen) to another GPU, there is no need to perform an update of the identifying information.

By virtue of the processing for rendering of the present embodiment, when generating a screen similar to that of the rendering technique of the conventional technique illustrated in FIG. 5, it is possible to allow for optimization of the processing for rendering as in FIG. 4. Specifically, because it is possible to generate a game screen that is a final output without performing rendering of an object that is occluded by an object close to a viewpoint, in other words without discarding a rendered pixel, it is possible to reduce a calculation amount in accordance with the processing for rendering.

When the processing for rendering completes, the CPU 101, in step S205 of the game processing, transmits the game screen generated in the fourth VRAM 112 to the display control unit 113 to cause display output, and completes the game processing in accordance with the current frame.

Note that in the present embodiment, the identifying information was explained as boolean mask data, but the implementation of the present invention is not limited to this. The identifying information for example may be a depth map (z-buffer) or the like, and in this case each GPU can identify pixels for which the depth is a maximum value (in a case of a grayscale map in which white has been defined as a furthest distance) and pixels for which a rendering object has not yet been rendered.

In addition, in the present embodiment, explanation was given for the CPU 101 performing the classification of rendering ranges and allocating a depth range to each GPU, but the implementation of the present invention is not limited to this. For example, in a case such as where a depth range to be handled is set for each GPU in advance, configuration may be taken in which, based on the information of the rendering range, each GPU individually determines a depth range at which to handle rendering, and performs processing.

In addition, with the present invention, because a calculation amount in each GPU is small and furthermore each GPU is used in a stepwise fashion, in system that renders a plurality of screens in parallel, for example, such as one that transmits by streaming rendered screens to a plurality of clients, it is possible to forecast further optimization of the processing for rendering.

As explained above, the rendering apparatus of the present embodiment is able to reduce unnecessary processing when performing processing for rendering one screen rendering by distributing it among a plurality of GPUs. Specifically, the rendering apparatus, based on information of a viewpoint corresponding to one screen, causes rendering in each of a plurality of GPUs, and determines a depth range from a rendering range corresponding to one screen. Each GPU, prior to image rendering, performs a predetermined calculation corresponding to a rendering object included in the depth range at which to render. A first GPU, after rendering by a second GPU that renders a second depth range that is closer to the viewpoint than a first depth range that the first GPU renders is performed, receives the image rendered by the second GPU and the identifying information that identifies the pixels for which rendering objects are rendered in the image. After the reception, the first GPU, when rendering a rendering object included in the first depth range in accordance with the viewpoint, performs rendering of pixels, from the image rendered by the second GPU, that are not identified by the identifying information, and does not perform rendering of pixels identified by the identifying information.

[Variation]

In the above described embodiment, explanation was given of being able to identify pixels where a rendering object has already been rendered in accordance with the identifying information, but for a rendering object that exists over a plurality of classified depth ranges, there is the possibility of ending up with an unnatural rendering result by following with the identifying information. For example, if for a rendering object classified in a depth range, from adjacent depth ranges, that is far from a viewpoint, the proximal end portion of the model data thereof intrudes into a depth range close to the viewpoint, there is the possibility that it will be displayed in front of a rendering object of a depth range that is close to the viewpoint. In other words, because there is the possibility of the occurrence of an anteroposterior relationship that does not follow the classification, a correct anteroposterior relationship between rendering objects may be broken due to the depth range classifying method.

Accordingly, in the present variation, for the identifying information, assumed to be a depth map, the role of the identifying information is made to be something that indicates a depth value of pixels for which a rendering object has already been rendered. In such a case, for pixels for which the second GPU 106 performs rendering, identification is performed by comparing a depth value of an object that the second GPU 106 is to render for the corresponding pixel with the depth value indicated by the identifying information. In other words, if the result of the comparison is that the depth value of the object that the second GPU 106 is to render indicates a value closer to the viewpoint, then the second GPU 106 may update the pixel value of the generated image by the processing for rendering.

Note that configuration may be taken such that here, for a pixel that has a value that indicates that the depth is a furthest distance, the second GPU 106 performs rendering unconditionally without comparing depth values. Because it is possible to limit pixels for which to compare depth values to pixels that are not of a value indicating that the pixel value is a furthest distance by performing in this fashion, it is possible to reduce a calculation amount required for the comparison.

In this way, it is possible to generate a game screen for which consistency of an anteroposterior relationship is guaranteed without performing discarding of rendering of unnecessary pixels.

[Other Embodiments]

The present invention is not limited to the embodiments described above, and it is possible to make various modifications or changes without straying from the spirit and scope of the present invention. In addition, the rendering apparatus according to the present invention can also be realized by a program that causes a computer to function as the rendering apparatus. The program can be provided/distributed by being recorded on a computer-readable storage medium, or through an electronic communication line. Accordingly, the following claims are attached to make public the scope of the present invention.

The invention claimed is:

1. A rendering apparatus that uses a plurality of renderers to render one screen, the rendering apparatus comprising:
a determiner which is able to determine, based on information of a viewpoint corresponding to the one screen, a depth range from a rendering range corresponding to the one screen at which to cause each of the plurality of renderers to render, wherein
each of the plurality of renderers performs a predetermined calculation corresponding to a rendering object included in the depth range at which to render, and wherein
a first renderer from the plurality of renderers,
after rendering is performed by a second renderer that renders at a second depth range closer to the viewpoint than a first depth range at which the first renderer renders, receives an image rendered by the second renderer and identifying information that identifies a pixel for which a rendering object has been rendered in the image, and
after reception, when rendering a rendering object included in the first depth range in accordance with the viewpoint, performs rendering of a pixel, from the image rendered by the second renderer, that is not identified by the identifying information, and does not perform rendering of a pixel identified by the identifying information.

2. The rendering apparatus according to claim 1, wherein the identifying information is information that identifies a pixel for which a rendering object included in the second depth range and all depth ranges closer to the viewpoint than the second depth range is rendered.

3. The rendering apparatus according to claim 1, wherein the identifying information is information that indicates a depth value of a rendering object rendered in the image rendered by the second renderer, and, is information that indicates that the rendering object is to be rendered for a corresponding pixel if the depth value is not a value that indicates a furthest distance.

4. The rendering apparatus according to claim 3, wherein, if a depth value of a pixel, from the image rendered by the second renderer, that is identified by the identifying information is of a value indicating further distance than a depth value of a rendering object to be rendered in that pixel which is included in the first depth range, the first renderer performs rendering of that pixel.

5. A rendering apparatus that uses a plurality of renderers to render one screen, wherein
each of the plurality of renderers includes
a determiner which is able to determine, based on information of a viewpoint corresponding to the one screen, a depth range, from a rendering range corresponding to the one screen, for which to handle rendering and
a calculator which is able to perform a predetermined calculation corresponding to a rendering object included in the depth range determined by the determiner, wherein
a first renderer from the plurality of renderers,
after rendering is performed by a second renderer that handles a second depth range closer to the viewpoint than a first depth range that the first renderer handles, receives an image rendered by the second renderer and identifying information that identifies a pixel for which a rendering object has been rendered in the image, and
after reception, when rendering a rendering object included in the first depth range in accordance with the viewpoint, performs rendering of a pixel, from the image rendered by the second renderer, that is not identified by the identifying information, and does not perform rendering of a pixel identified by the identifying information.

6. A rendering apparatus that uses a plurality of renderers to render one screen, the rendering apparatus comprising:
a determiner which is able to determine, based on information of a viewpoint corresponding to the one screen, a depth range from a rendering range corresponding to the one screen at which to cause each of the plurality of renderers to render, wherein
each of the plurality of renderers performs a predetermined calculation corresponding to a rendering object included in the depth range at which to render, and wherein
a first renderer from the plurality of renderers,
after rendering is performed by a second renderer that renders at a second depth range closer to the viewpoint than a first depth range at which the first renderer renders, receives an image rendered by the second renderer and depth information that indicates a depth value of each pixel in the image, and
after reception, when rendering a rendering object included in the first depth range in accordance with the viewpoint, if a depth value of a pixel, from the image rendered by the second renderer, that is indicated by the depth information is of a value indicating a further distance than a depth value of a rendering object to be rendered in that pixel which is included in the first depth range, performs rendering of that pixel, and if the depth value is of a value that does not indicate the further distance, does not render that pixel.

7. A rendering apparatus that uses a plurality of renderers to render one screen, wherein each of the plurality of renderers includes a determiner which is able to determine, based on information of a viewpoint corresponding to the one screen, a depth range, from a rendering range corresponding to the one screen, for which to handle rendering and a calculator which is able to perform a predetermined calculation corresponding to a rendering object included in the depth range determined by the determiner, wherein a first renderer from the plurality of rendering means, after rendering is performed by a second renderer that handles a second depth range closer to the viewpoint than a first depth range that the first renderer handles, receives an image rendered by the second renderer and depth information that indicates a depth value of each pixel in the image, and after reception, when rendering a rendering object included in the first depth range in accordance with the viewpoint, if a depth value of a pixel, from the image rendered by the second renderer, that is indicated by the depth information is of a value indicating a further distance than a depth value of a rendering object to be rendered in that pixel which is included in the first depth range, performs rendering of that pixel, and if the depth value is of a value that does not indicate the further distance, does not render that pixel.

* * * * *